United States Patent
Leinung et al.

(10) Patent No.: US 11,440,514 B2
(45) Date of Patent: Sep. 13, 2022

(54) METHOD FOR OPERATING A BRAKING DEVICE AND BRAKING DEVICE FOR MOTOR VEHICLES

(71) Applicant: KNORR-BREMSE Systeme fuer Nutzfahrzeuge GmbH, Munich (DE)

(72) Inventors: Andreas Leinung, Munich (DE); Georg Mueller, Munich (DE); Marius Schmid, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 152 days.

(21) Appl. No.: 16/764,729

(22) PCT Filed: Nov. 15, 2018

(86) PCT No.: PCT/EP2018/081441
§ 371 (c)(1),
(2) Date: May 15, 2020

(87) PCT Pub. No.: WO2019/096934
PCT Pub. Date: May 23, 2019

(65) Prior Publication Data
US 2021/0171001 A1    Jun. 10, 2021

(30) Foreign Application Priority Data

Nov. 16, 2017 (DE) ............ 10 2017 126 976.2

(51) Int. Cl.
*B60T 7/20* (2006.01)
*B60T 8/17* (2006.01)
(Continued)

(52) U.S. Cl.
CPC .............. *B60T 7/20* (2013.01); *B60T 8/1708* (2013.01); *B60T 13/385* (2013.01);
(Continued)

(58) Field of Classification Search
CPC ........ B60T 7/20; B60T 17/221; B60T 15/027; B60T 2270/406; B60T 13/385; B60T 8/1708; B60T 2270/88; B60T 13/683
See application file for complete search history.

(56) References Cited

U.S. PATENT DOCUMENTS 4,763,959 A * 8/1988 Vandemotter ........... B60T 13/66
303/9
5,061,015 A * 10/1991 Cramer ................ B60T 13/683
303/7
(Continued)

FOREIGN PATENT DOCUMENTS

DE    33 44 252 A1    6/1984
DE    35 45 021 A1    6/1987
(Continued)

OTHER PUBLICATIONS

Specification translation of German Patent No. DE 19955798 obtained from website: https://worldwide.espacenet.com/ on Dec. 14, 2021.*
(Continued)

*Primary Examiner* — Pamela Rodriguez
(74) *Attorney, Agent, or Firm* — Crowell & Moring LLP

(57) ABSTRACT

A method operates a braking device for motor vehicles, in particular for utility vehicles. Along a trailer supply line for supplying air to a parking brake of a trailer and/or a trailer control line for supplying air to an operating brake of a trailer, the air pressure is measured by at least one pressure transducer and is transmitted in the form of an electric signal to an electronic control unit of the motor vehicle. In the event of a faulty pressure change response, an open trailer supply line and/or an open trailer control line is detected.

14 Claims, 1 Drawing Sheet

(51) Int. Cl.
  *B60T 13/38* (2006.01)
  *B60T 13/68* (2006.01)
  *B60T 15/02* (2006.01)
  *B60T 17/22* (2006.01)

(52) U.S. Cl.
  CPC .......... *B60T 13/683* (2013.01); *B60T 15/027* (2013.01); *B60T 17/221* (2013.01); *B60T 2270/406* (2013.01); *B60T 2270/88* (2013.01)

(56) References Cited

U.S. PATENT DOCUMENTS

| | | | |
|---|---|---|---|
| 9,758,140 B2* | 9/2017 | Eberling | B60T 13/403 |
| 10,933,854 B2* | 3/2021 | Bruett | B60T 13/263 |
| 2008/0030068 A1 | 2/2008 | Bensch et al. | |
| 2010/0237690 A1 | 9/2010 | Foerster et al. | |
| 2012/0299369 A1 | 11/2012 | Wieder et al. | |
| 2015/0239441 A1* | 8/2015 | Klostermann | B60T 15/028 303/7 |

FOREIGN PATENT DOCUMENTS

| | | |
|---|---|---|
| DE | 35 21 446 A1 | 12/1988 |
| DE | 42 00 302 C2 | 8/1995 |
| DE | 199 55 798 A1 | 5/2001 |
| DE | 10 2006 036 748 A1 | 2/2008 |
| DE | 10 2012 101 501 A1 | 8/2013 |
| EP | 0 205 928 B1 | 10/1998 |
| EP | 2 631 131 B1 | 7/2016 |
| GB | 2 131 509 A | 6/1984 |
| WO | WO 2009/046780 A2 | 4/2009 |
| WO | WO 2011/061179 A1 | 5/2011 |

OTHER PUBLICATIONS

Claim translation of German Patent No. DE 19955798 obtained from website: https://worldwide.espacenet.com/on Dec. 14, 2021.*
International Preliminary Report on Patentability (PCT/IB/326 & PCT/IB/373) issued in PCT Application No. PCT/EP2018/081441 dated May 28, 2020, including English translation of document C2 (German-language Written Opinion (PCT/ISA/237) previously filed on May 15, 2020) (10 pages).
International Search Report (PCT/ISA/210) issued in PCT Application No. PCT/EP2018/081441 dated Feb. 14, 2019 with English translation (six (6) pages).
German-language Written Opinion (PCT/ISA/237) issued in PCT Application No. PCT/EP2018/081441 dated Feb. 14, 2019 (nine (9) pages).

* cited by examiner

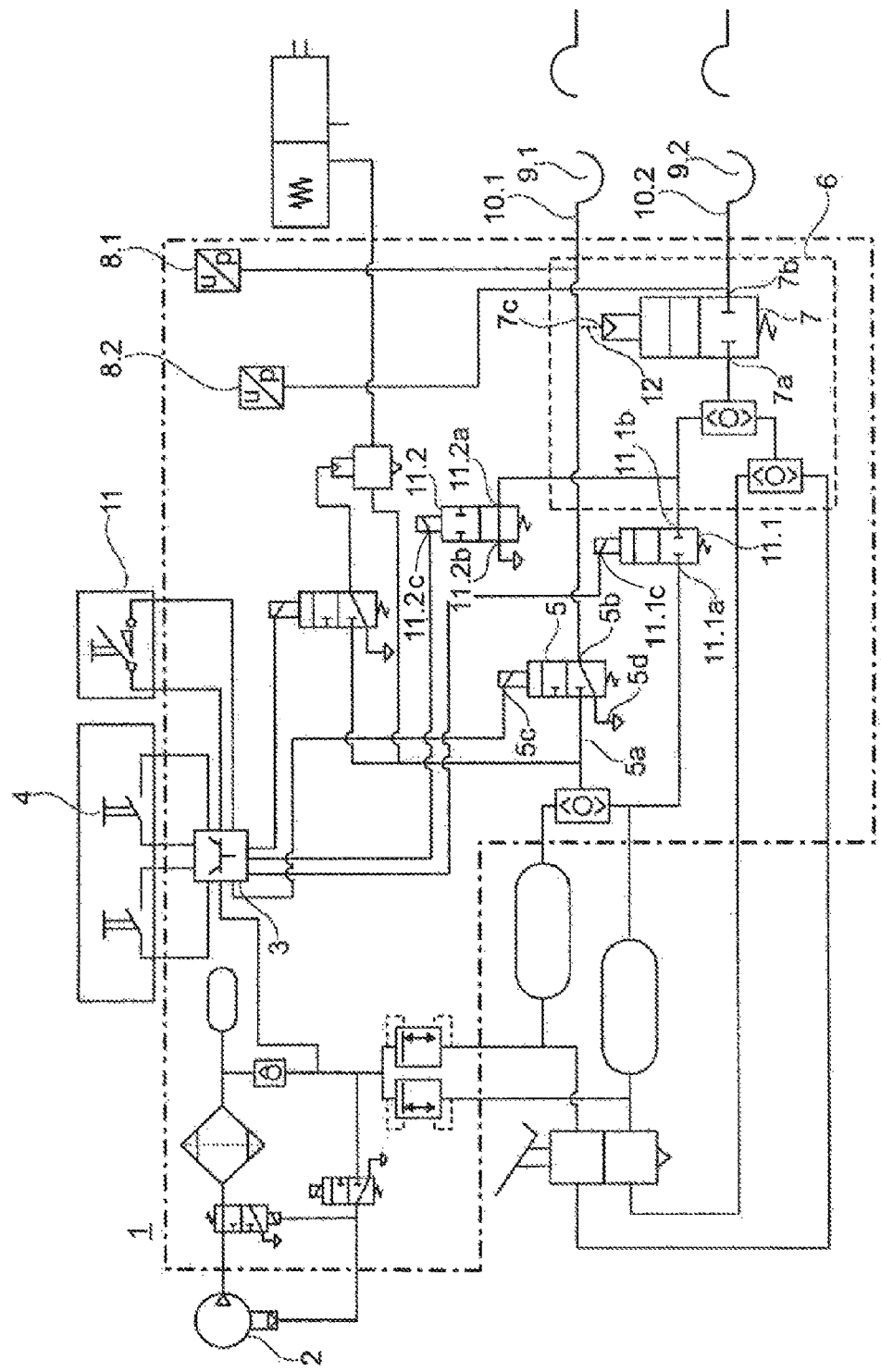

METHOD FOR OPERATING A BRAKING DEVICE AND BRAKING DEVICE FOR MOTOR VEHICLES

BACKGROUND AND SUMMARY OF THE INVENTION

The invention relates to a method for operating a braking device for motor vehicles, in particular for utility vehicles, wherein the air pressure is detected by means of at least one first pressure transducer along a trailer supply line and/or a trailer control line and is transmitted in the form of an electrical signal to an electronic control unit of the motor vehicle. Furthermore, the invention relates to a braking device for motor vehicles, in particular for utility vehicles.

Parking brakes (also called emergency brakes) of utility vehicles including trailers and also rail vehicles are presently regularly equipped with spring-type brake cylinders, which apply compressed air to a spring compression chamber in the release position and thus keep the spring tensioned, while for parking brakes the spring compression chamber is vented, i.e., is connected to atmospheric pressure, so that the brake cylinder generates a braking force under the action of the spring (cf. Bosch, Kraftfahrtechnisches Taschenbuch [automotive engineering handbook], $22^{nd}$ edition, Dusseldorf, 1995, p. 648).

Known methods for determining the coupling state of a truck having electro-pneumatic braking system, as disclosed by DE 42 00 302 C2, are restricted to the analysis of the time curve of a pressure increase in a pressure line.

Furthermore, a device for trailer detection is known from DE 199 55 798 A1, wherein this device detects whether the pneumatic pressure hoses are connected to the tractor or not.

For proper operation of a braking device, it is a requirement that in particular an automatic release of the electrical parking brake can be carried out. In particular in a stop-and-go mode or comparable applications, such an automatic release of the parking brake is desired. Without a rapid check of the presence of a trailer and/or of the coupling state of a trailer, the procedure of releasing the parking brake can possibly only be terminated in a delayed manner and in conjunction with a significant pressure loss.

It is therefore the object of the present invention to refine a method for operating a braking device of the type mentioned at the outset in an advantageous manner, in particular in such a way that a braking device is to be monitored comparatively easily and rapidly with respect to the pressure conditions, so that the proper operation of the braking device can be ensured. Furthermore, it is an object of the present invention to refine a braking device in such a way, in particular such that the braking device is simply constructed and simultaneously enables extensive monitoring of the system.

This object is achieved according to the invention by a braking device, as well as a method for operating the braking device for motor vehicles, in particular for utility vehicles, wherein the air pressure is detected by at least one first pressure transducer along a trailer supply line for aerating a parking brake of a trailer and/or a trailer control line for aerating a service brake of a trailer and is transmitted in the form of an electrical signal to an electronic control unit of the motor vehicle, so that in case of a faulty pressure change behavior, an open trailer supply line and/or an open trailer control line is detected.

The invention is based on the basic concept that, on the basis of the method, the braking device of motor vehicles can preferably be automatically monitored during the operation, in particular by means of the electronic control unit and at least one pressure transducer or pressure sensor.

For this purpose, a pneumatic pressure is preferably detectable at an output of the preferably pneumatic braking device, in particular at a trailer coupling.

In these terms, in case of a faulty pressure change behavior, an open trailer supply line and/or an open trailer control line is automatically detected.

It is thus possible that a faulty coupling state between tractor and trailer is in particular detected independently by the system, in particular the electronic control unit in conjunction with the at least one first pressure transducer.

Appropriate countermeasures and/or protective measures can possibly be initiated automatically by the system, in particular the electronic control unit.

In particular, the automatic monitoring of the state of the braking device of the motor vehicle and/or of the coupling to the trailer can be triggered due to greatly varying types of electrical signals.

Among other things, data with respect to the vehicle state of the motor vehicle, such as a position of the gas pedal or the clutch pedal, an item of transmission information, a vehicle velocity, an item of distance information in relation to other road users or the like, and also an arbitrary combination of such items of information can be processed by means of the electronic control unit and used to trigger an automatic check of the operational reliability of the braking device.

It is similarly also possible that the electronic control unit performs a manually triggered check of the operational readiness of the motor vehicle in that a corresponding input element and/or electrical signal is transmitted to the electronic control unit by a manually operable smart phone, a touchscreen, or other types of operating elements.

It is thus possible with the aid of the electronic control unit and at least one first pressure transducer to provide a variety of monitoring and control options for the operation of the motor vehicle and/or the braking device. Electronic monitoring of the coupling state for a trailer is enabled.

It is provided that the air pressure is detected by means of at least one first pressure transducer along a trailer supply line for aerating a parking brake of a trailer and/or a trailer control line for aerating a service brake of a trailer and transmitted in the form of an electrical signal to an electronic control unit of the motor vehicle.

It is preferably provided that the trailer supply line provides compressed air for supplying the parking brake of the coupled-on trailer as needed.

It is furthermore preferably provided that the trailer control line provides compressed air for supplying the service brake of the coupled-on trailer as needed.

An air pressure and/or a pneumatic pressure change in the trailer supply line and/or the trailer control line can thus be detected and observed with the aid of the at least one first pressure transducer.

A leak such as a faulty coupling state of the trailer, due to which compressed air can escape from the trailer supply line and/or the trailer control line, is thus preferably automatically determinable during the operation.

In case of a faulty pressure change behavior, an open trailer supply line and/or an open trailer control line is thus detected.

In addition, further technical problems are also detectable in conjunction with the braking device, which result in a deviating, in particular a faulty pressure change behavior.

A pressure change behavior can in general be a change of the pneumatic pressure in the form of a pressure increase or a pressure drop, and also a constant pneumatic pressure.

It can furthermore be provided that the faulty pressure change behavior is detected if the measured air pressure deviates within a predefinable timeframe from a predeterminable pressure change threshold value.

In terms of the present invention, a pressure change threshold value can also always be a pressure change threshold value range.

A pressure change threshold value can be a threshold value with respect to a pressure increase, pressure drop, or uniform pressure to be expected.

In particular, a pressure drop or pressure increase can occur within the predefinable timeframe, so that the measured air pressure deviates from a predefinable pressure change threshold value or pressure change threshold value range to be expected. In this case, a faulty pressure change behavior is provided.

A faulty pressure change behavior thus describes in particular a behavior of the pneumatic pressure within the braking system which does not move within predetermined limits to be expected.

It can be provided that, in the case of released parking brake of the trailer and tearing away of the trailer supply line and/or the trailer control line, a faulty pressure change behavior exists if the measured air pressure change corresponds to an absolute-value pressure change value which is greater than the predeterminable pressure drop threshold value.

In particular, the pressure drop threshold value can be a pressure drop threshold value range to be expected.

The parking brake is released and in this meaning is aerated using compressed air. If the trailer supply line and/or the trailer control line is torn off and/or not properly connected to the trailer, a pressure drop results.

If this measured pressure change value of the pressure drop after the absolute value formation exceeds the predefinable pressure drop threshold value or pressure drop threshold value range, a faulty pressure change behavior exists.

In terms of the absolute-value pressure change value, a positive pressure change value thus results from a pressure drop after the formation of the mathematical absolute value.

The absolute-value pressure change value describes the change of the air pressure within a predetermined or predeterminable timeframe, in particular at at least two different points in time.

A measured air pressure change thus results from at least two measured values, which are detected at the beginning and at the end of a predefined waiting time by means of the at least one first pressure transducer.

In particular, it can be provided that the detectable pressure change value is computable by means of a computer model independently of the vehicle-specific design of the pneumatic system.

It is also conceivable that the ascertainment of a flow resistance of the trailer supply line or the trailer control line is possible at a low pneumatic pressure, for example, between 100 and 500 mbar, so that in particular volumes of the pneumatic lines of the trailer are negligible.

Furthermore, it can be provided that in the case of the engaged parking brake of the trailer, after the aerating of the trailer supply line and/or the trailer control line and a non-connected trailer supply line or trailer control line, a faulty pressure change behavior exists if the measured air pressure change corresponds to a pressure change value which is less than the predefinable pressure increase threshold value.

If the parking brake is engaged, firstly the trailer supply line and/or the trailer control line is aerated. If the trailer supply line is not connected, a faulty pressure change behavior can be established in that the measured air pressure change is less than the previously established pressure increase threshold value.

The pressure increase threshold value or pressure increase threshold value range corresponds in these terms to an increase of the air pressure to be expected.

In this manner, in particular a faulty pressure change behavior in the trailer supply line is ascertainable due to a deviation from a pressure change threshold value or a pressure drop threshold value or a pressure increase threshold value to be expected.

In this case, a slow pressure drop in the trailer control line and/or in the trailer supply line can also indicate a faulty pressure change behavior and thus a malfunction of the braking device.

Furthermore, it can be provided that for detecting a faulty compressed air change behavior in the trailer control line, a pneumatic test pulse is generated by means of a first switching valve in conjunction with the trailer supply line and/or a pneumatic test pulse is generated along an input and an output of a second switching valve in conjunction with the trailer control line.

For this purpose, a predeterminable timeframe or a predeterminable waiting time for detecting pressure values in extended form can be provided, in particular to enable and/or take into consideration switching of the second switching valve for the detection of measured values.

In particular, it can be provided that the input and the output of the second switching valve are connected to one another and the pneumatic test pulse can be generated by means of an inlet valve and/or a vent valve or by means of an electrical braking signal.

The first switching valve is preferably fluidically connected to the trailer supply line.

The second switching valve is preferably fluidically connected to the trailer control line.

A test pulse can be understood to be a specific, definable compressed air pulse.

In particular, a pneumatic test pulse in the form of a compressed air pulse can be used to detect a compressed air change behavior in the trailer control line by means of the at least one first compressed air transducer.

A coupling can preferably be provided between the trailer supply line and the second switching valve, so that an air pressure is usable for controlling the second switching valve.

A pneumatic test pulse or a compressed air pulse can be generated along the trailer control line in particular by the inlet valve and/or a vent valve or by means of an electrical braking signal.

In these terms, the inlet valve and the vent valve are preferably fluidically connected to the second switching valve.

Furthermore, a brake pedal can be provided and actuatable to generate an electrical braking signal in order to trigger a pneumatic test pulse along the compressed air control line.

Furthermore, it can be provided that the first switching valve is provided in conjunction with the trailer supply line, which is switched with the aid of the control unit into the venting state when a faulty pressure change behavior is detected in the trailer supply line and/or the trailer control line.

Very generally, in particular independently of the application of a test pulse for detecting faulty pressure change behavior in the trailer control line, the first switching valve can be switched into the venting state if a faulty pressure change behavior is detected in the trailer supply line and/or the trailer control line.

In particular, a protective function is provided for the braking system, so that a parking brake of the trailer is automatically vented and actuated as soon as a faulty pressure change behavior is detected.

For this purpose, a coupling can preferably be provided between the compressed air supply line and the second switching valve, in such a way that the second switching valve is controlled in conjunction with the compressed air control line in dependence on the air pressure in the trailer supply line.

Furthermore, an electrical connection is preferably provided between the electronic control unit and the first switching valve.

The electronic control unit can switch the first switching valve as needed into the venting state if a faulty pressure change behavior is detected in the trailer supply line and/or in the trailer control line.

Venting of the trailer supply line is effectuated by switching the first switching valve, in particular into a venting state.

A malfunction, for example, a leak, can be established by means of at least one first pressure transducer as soon an unexpected change or an unexpected absence of a change of the air pressure in the trailer supply line and/or in the trailer control line is detected.

In dependence on the air pressure in the trailer supply line, the second switching valve is switched with the aid of the coupling line into a disconnected state or to passage.

A protective function of the tractor against a pressure loss and a loss of braking power linked thereto is available with the aid of the second switching valve.

The second switching valve can be designed in these terms as a shutoff valve, in particular in the form of a tractor protective valve.

The method for detecting a faulty pressure change behavior can preferably be able to be triggered or initiated in conjunction with, for example, a launch detection by the electronic control unit, preferably can be able to be automatically triggered.

A compressed air change behavior along the trailer supply line and/or the trailer control line can thus preferably be observed and monitored automatically with the aid of the at least one first compressed air transducer and also the electronic control unit.

In a concurrent aspect, a braking device for motor vehicles, in particular for utility vehicles, is provided.

The braking device is provided with at least one compressed air fitting, an electronic control unit, at least one input element, at least one first switching valve, at least one first pressure transducer, and also a first trailer coupling unit and a second trailer coupling unit.

The electronic control unit is connected, in particular electrically connected, to the input element, a control input of the first switching valve, and the first pressure transducer.

A trailer supply line is provided in such a way that an output of the first switching valve is connected to the first trailer coupling unit.

Furthermore, a trailer control line is provided and the first pressure transducer is connected to the trailer supply line and/or the trailer control line.

The input element is preferably provided as an electrical input signal, which can in particular fulfill the typical function of a switch for triggering a switching signal.

In particular, the input element can be triggered as an electrical signal by a launch detection or another type of data of the motor vehicle which result from the operating state of the motor vehicle.

Data can thus be processed by a plurality of sensors of a motor vehicle and from the field of autonomous driving, for example, distances to other road users, in order to trigger an input element in the form of an electrical signal as needed.

Alternatively, the input element can be considered to be an input switch for manual or automatic actuation.

In particular if a manual actuation of the input switch is provided, the input element can be designed in the form of a smart phone, a touchscreen, or a comparable component.

The braking device can be connected with the aid of the compressed air fitting to an arbitrary compressed air source.

Both the supply of processed compressed air and also the supply of fresh compressed air and an adequate compressed air processing within the braking device are conceivable.

A pressure transducer can be designed in terms of the present invention as a sensor, a (pressure) switch, or a comparable element for qualitative or quantitative detection and/or recognition of a pneumatic pressure in a compressed air line in particular.

A trailer supply line is provided in such a way that an output of the switching valve is connected to the first trailer coupling unit. The first trailer coupling unit is provided in particular for coupling to a parking brake of the trailer A trailer control line is provided in such a way that an output of the second switching valve is connected to the second trailer coupling unit. The second trailer coupling unit is provided in particular for coupling to a service brake of the trailer.

The braking device according to the invention is based on the fundamental concept that, with the aid of an electronic control unit and at least one pressure transducer, a variety of monitoring and control options can be provided for the operation of the motor vehicle and/or the braking device, in particular monitoring of the coupling state for a trailer and also a tractor protective function.

Electronic monitoring of the coupling state for a trailer and also a tractor protective function are thus enabled.

In these terms, a motor vehicle, in particular a utility vehicle, is preferably to be understood as a tractor having at least one trailer.

An electrification in terms of the braking device according to the invention is available with the aid of the electronic control unit, so that auxiliary functionalities can be provided in relation to conventional, in particular predominantly manually controllable braking systems.

Auxiliary functionalities can relate to the monitoring of the proper operation of the braking device, the automated control in various operating modes such as a stop-and-go mode or a delivery mode, and protective functions in the event of failure or malfunction of individual parts of the braking device.

Not only the coupling state of a tractor with a trailer can thus be monitored; rather, among other things, protective mechanisms can be automatically or semi-automatically initiated in the event of malfunctions which affect the coupling mechanism.

An integration and/or combined design of the braking device according to the invention can be provided in conjunction with an air processing unit, an electrical parking brake, an electronic braking system, or an antilock braking system.

In particular, it can be provided that the at least one first pressure transducer is an external pressure sensor which is pneumatically and electrically connected to the braking device, preferably to a parking brake device.

The at least one first pressure transducer can be electrically integrated in terms of the present invention into a parking brake system, wherein a pneumatic connection to the trailer supply line or the trailer control line is provided.

Furthermore, the first pressure transducer can also be provided as an external pressure sensor, which is electrically and pneumatically connected to the parking brake and/or the braking device.

The electronic control unit is connected to the input element, a control input of the switching valve, and the first pressure transducer.

The control unit is preferably electrically connected to the various components of the braking device to be able to process a variety of data, such as switch positions and valve positions and also measured values of sensors.

The control unit represents a central control means for recording, processing, and relaying data and/or signals, in particular for automatic or semiautomatic control of the braking device.

A trailer supply line is provided in such a way that an output of the first switching valve is connected to the first trailer coupling unit.

In this manner, the first trailer coupling unit can be aerated, i.e., supplied with compressed air, or vented in dependence on the switching state of the first switching valve.

Compressed air can thus be provided for a parking brake, in particular a spring-type parking brake, of a trailer at the first trailer coupling unit.

The first switching valve can be provided in particular as an electrically activatable, bistable switching valve.

It can furthermore be provided that the braking device comprises a second switching valve, wherein the trailer control line is provided in such a way that an output of the second switching valve is connected to the second trailer coupling unit.

The second switching valve can be designed, inter alia, in terms of a shutoff valve, in particular a tractor protective valve.

It is fundamentally the task of the second switching valve to provide a pneumatic connection to the second trailer coupling unit as needed.

The first pressure transducer can be connected to the output of the first switching valve or to the output of the second switching valve.

A trailer control line is provided in such a way that an output of the second switching valve is connected to the second trailer coupling unit.

In particular, compressed air can be provided at the second trailer coupling unit for a service brake of the trailer with the aid of the trailer control line.

The second switching valve can be provided as a component of the tractor protective valve.

A connection to the trailer control line can be interrupted with the aid of the second switching valve if, for example, an undesired pressure loss and/or a leak occurs in the trailer supply line.

In this manner, an air pressure and/or a pressure change behavior, i.e., a change of the air pressure, can be measured and/or monitored in the trailer supply line and/or in the trailer control line.

A pressure change behavior is to be understood in terms of the present invention in particular to mean that in dependence on the intended use of the trailer supply line or the trailer control line, in each case a defined behavior of the air pressure is to be expected during the operation of the braking device.

Accordingly, deviations from the pressure change behavior to be expected indicate a leak or other type of fault in the pneumatic circuit, in particular the trailer supply line and/or the trailer control line.

A pressure change behavior to be expected can be both the change of an air pressure and also the maintenance of a defined air pressure during operation.

A faulty pressure change behavior in the trailer supply line can be understood in this case to mean that fluid pressure or air pressure cannot be generated in the trailer supply line or an existing fluid pressure in the trailer supply line unexpectedly drops or increases.

A faulty pressure change behavior can thus exist in the trailer supply line if a trailer is supposed to be connected to the first trailer coupling unit and air pressure cannot be built up in the trailer supply line.

The coupling state between tractor and trailer can thus be ascertained and/or monitored.

A leak or other type of irregular pressure change behavior in the trailer supply line, for example, an unexpected pressure drop, can also be detected in this way, wherein as a result protective measures can preferably be initiated by means of the control unit.

Alternatively, the first pressure transducer in the trailer control line can be provided in conjunction with the output of the second switching valve to be able to determine a pressure change behavior at the second trailer coupling unit.

A faulty pressure change behavior in the trailer control line is thus to be understood, for example, to mean that an expected pressure change at the input of the second switching valve between the output of the second switching valve and the second trailer coupling unit is not detectable or an unexpected pressure change is detectable.

The expected pressure change can be derived in this case from the actuation of operating elements such as a brake pedal and/or an electrical braking signal and can be processed in the control unit.

The air pressure and/or the pressure change behavior in the trailer supply line or the trailer control line can be monitored in this manner to detect a possible malfunction by means of the control unit and be able to initiate protective measures, for example, by switching valves.

Furthermore, a coupling line can be provided, so that the trailer supply line is connected to a control input of the second switching valve.

The second switching valve is switchable in dependence on the air pressure or fluid pressure in the trailer supply line.

In case of an air pressure drop in the trailer supply line, the second switching valve is preferably switched into a disconnected state, so that no connection exists between the input and the output of the second switching valve.

In this manner, the trailer control line can be protected from an unexpected drop of the air pressure in case of a leak in the trailer supply line.

In addition to an ascertainment and check of the coupling state between tractor and trailer, a tractor protective function can thus also be provided by means of the braking device according to the invention.

Furthermore, it can be provided that the at least one first pressure transducer is provided in conjunction with an output of the first switching valve and at least one second pressure transducer is provided in conjunction with an output of the second switching valve.

The braking device according to the invention can be designed in these terms having at least two pressure transducers, wherein a pressure change behavior in the trailer supply line and in the trailer control line is determinable independently of one another.

Thus, for example, a leak or a malfunction can be detected both in the trailer supply line and also in the trailer control line in a reliable manner. For this purpose, solely the use of a second pressure transducer in conjunction with the control unit is necessary.

Furthermore, the coupling state can also be ascertained at the first trailer coupling unit and the second trailer coupling unit.

Alternatively, it is to be taken into consideration that upon use of a single first pressure transducer at the trailer control line, a leak or the like is also determinable in the trailer supply line.

Due to the coupling line and the dependence resulting therefrom of the switching state of the second switching valve on the air pressure in the trailer supply line, a faulty pressure change behavior in the trailer supply line also causes a detectable deviation from the pressure change behavior to be expected in the trailer control line.

It can furthermore be provided that at least one input element is provided in conjunction with the electronic control unit, so that the first switching valve is switchable, in particular is electrically switchable, by means of the input element.

In terms of an electrification of the control of a braking device, in this manner an automation or semi-automation which is convenient and can be designed in manifold ways can be implemented.

Thus, for example, by actuating the input element in the form of a user input or by generating an input element as an electrical signal on the basis of, for example, a trailer launch detection, an emergency brake or parking brake can be aerated or vented by means of the first switching valve.

Alternatively, other types of functionalities of the input element can be implemented and/or provided with the aid of the centrally provided electronic control unit.

In addition, an inlet valve can be provided in such a way that the input of the second switching valve is connected or connectable to an output of the inlet valve.

An input of the inlet valve can be connected or connectable to the compressed air fitting in particular directly or indirectly, i.e., via further components of the pneumatic circuit, so that compressed air can be provided via the inlet valve.

In this manner, compressed air can be supplied in controlled form to the input of the second switching valve with the aid of the inlet valve.

Furthermore, a vent valve can be provided in such a way that an input of the vent valve is connected to the output of the inlet valve.

The input of the vent valve is, like the input of the inlet valve, connected or connectable to the input of the second switching valve.

An air pressure at the input of the second switching valve is thus intentionally settable and/or controllable by means of the inlet valve and the vent valve.

In addition, an anti jackknife brake unit can be provided in conjunction with the electronic control unit, so that the inlet valve is electrically switchable via a control input and the vent valve is electrically switchable via a control input by means of the control unit.

In these terms, an anti jackknife brake unit is provided for providing an anti-jackknife brake functionality for the motor vehicle.

With the aid of such an anti-jackknife brake unit, in particular for activating the inlet valve and the vent valve by means of the control unit, compressed air can be intentionally supplied via the second switching valve to the second trailer coupling unit for a service brake of the trailer.

The motor vehicle can be stretched by braking of the trailer, which can preferably be graduated, and can be stabilized in this manner.

Further details and advantages of the invention are to be explained on the basis of an exemplary embodiment illustrated in greater detail in the drawing.

BRIEF DESCRIPTION OF THE DRAWING

FIG. 1 is a schematic diagram showing an exemplary embodiment of a braking device for motor vehicles having a first and second pressure transducer.

DETAILED DESCRIPTION OF THE DRAWING

An exemplary embodiment of a braking device 1 for motor vehicles having a compressed air fitting 2 and an electronic control unit 3 is illustrated in FIG. 1.

Compressed air can be supplied to the braking device 1 via the compressed air fitting 2, to be used further for the braking device 1, preferably after compressed air processing to remove oil and moisture from the compressed air.

In particular, the compressed air fitting 2 can be connected to an arbitrary compressed air source.

Furthermore, the electronic control unit 3 represents a central control. The control unit 3 is thus electrically connected to the other components of the braking device 1, such as valves, sensors, switches, or other types of input elements 4.

An input element 4 can be understood in these terms as a sensor, switch, or the like, in particular as an electrical signal of the sensor, switch, or the like at the electronic control unit 3, so that automatic monitoring of the braking device can be triggered as needed.

All signals and data can be supplied to the control unit 3, processed in the control unit 3, and control commands resulting therefrom can be relayed to at least one of the components of the braking device 1.

Furthermore, according to FIG. 1, an input element 4 and a first switching valve 5 having an input 5*a*, an output 5*b*, a control input 5*c*, and a venting output 5*d* are shown.

The input element 4 is electrically connected to the control unit 3.

The first switching valve 5 is connected via the control input 5*c* to the control unit 3.

Switching of the first switching valve 5 can thus be effectuated using the input element 4 via the control unit 3.

The first switching valve 5 is switched according to FIG. 1 as a spring-loaded 3/2-way valve in such a way that the output 5*b* is connected to the venting output 5*d*.

In particular, the first switching valve 5 can be provided as a bistable switching valve.

Furthermore, the braking device 1 comprises a first trailer coupling unit 9.1 and a second trailer coupling unit 9.2.

The first trailer coupling unit 9.1 is connected via a trailer supply line 10.1 to the output 5*b* of the first switching valve 5.

According to the switching state of the first switching valve 5 in FIG. 1, the trailer supply line is vented via the venting output 5*d* of the first switching valve 5.

Compressed air for aerating a parking brake and/or spring-type emergency brake of a trailer can preferably be provided via the trailer supply line 10.1 at the first trailer coupling unit 9.1.

Furthermore, a second switching valve 7 is shown in FIG. 1.

In particular, the second switching valve 7 in terms of FIG. 1 can be provided in the form of a tractor protective valve 6.

The second switching valve 7 comprises an input 7*a*, an output 7*b*, and a control input 7*c*.

The input 7*a* of the second switching valve 7 is indirectly connected via diverse pneumatic circuit components to the compressed air fitting 2 in such a way that, for example, by actuating a brake pedal, compressed air, in particular processed compressed air, can be supplied to the input 7*a* of the second switching valve.

The output 7*b* of the second switching valve 7 is connected via a trailer control line 10.2 to the second trailer coupling unit 9.2 to be able to supply it with compressed air.

The second trailer coupling unit 9.2 can be provided in particular for providing compressed air for a service brake of a trailer.

According to FIG. 1, the second switching valve 7 is provided as a spring-loaded and normally closed or disconnected 2/2-way valve. In these terms, a connection between the input 7*a* and the output 7*b* of the second switching valve 7 is disconnected in the switching state according to FIG. 1.

The control input 7*c* of the second switching valve 7 is connected via a coupling line 12 to the trailer supply line 10.1 and the output 5*b* of the first switching valve 5.

Switching of the second switching valve 7 can thus be effectuated by changing the air pressure or the fluid pressure in the trailer supply line 10.1.

In these terms, a pressure drop in the trailer supply line 10.1 and/or at the output 5*b* of the first switching valve 5 can have the result that the second switching valve 7 is transferred from a transmissive switching position into the disconnected switching position shown in FIG. 1.

According to FIG. 1, the switching position of the second switching valve 7 is coupled to the air pressure or the fluid pressure in the trailer supply line 10.1.

In addition, the braking device 1 in FIG. 1 is shown having a first pressure transducer or pressure sensor 8.1 and a second pressure transducer or pressure sensor 8.2.

The first pressure transducer 8.1 is electrically connected to the control unit 3 and also the trailer supply line 10.1, i.e., the first pressure transducer 8.1 detects the air pressure in the trailer supply line 10.1, at the output 5*b* of the switching valve 5, and/or at the first trailer coupling unit 9.1.

The second pressure transducer 8.2 is electrically connected to the control unit 3 and also the trailer control line 10.2, i.e., the second pressure transducer 8.2 detects the air pressure in the trailer control line 10.2, at the output 7*b* of the second switching valve 7, and/or at the second trailer coupling unit 9.2.

By means of the first and second pressure transducer 8.1; 8.2, it can be established whether a suitable air pressure for operating the motor vehicle is present in the trailer supply line 10.1 and/or the trailer control line 10.2.

In particular also the coupling state between tractor and trailer at the first and second trailer coupling unit 9.1; 9.2 may be derived from the air pressures in the trailer supply line 10.1 and the trailer control line 10.2.

This function can be understood as a trailer detection function.

If the first pressure transducer 8.1 in the trailer supply line 10.1 detects the air pressure and/or the pressure change behavior and the control unit 3 recognizes a faulty pressure change behavior therein, for example, suitable protective measures can be initiated by the control unit 3.

The same applies to the case in which a faulty pressure change behavior is derived by the control unit 3 from the measured values of the second pressure transducer 8.2 relating to the air pressure in the trailer control line 10.2.

If, during the operation of the braking device 1 in a motor vehicle, an air pressure in the trailer supply line 10.1 unexpectedly drops, switching over of the second switching valve 7 takes place simultaneously with the aid of the coupling line 12 at the control input 7*c* of the second switching valve 7.

This can be understood as a tractor protective function, wherein by switching over the second switching valve 7 upon pressure loss in the trailer supply line 10.1, a potential possible pressure loss in the trailer control line 10.2 is prevented.

Furthermore, a faulty pressure change behavior in the trailer supply line 10.1 can exist, for example, in the event of an unexpected pressure drop or if no pressure buildup or no sufficient pressure buildup can be established in the trailer supply line 10.1 after the startup of the motor vehicle and with coupled-on trailer.

Faulty pressure change behavior in the trailer control line can exist if a brake pulse, which is also applied in particular at an input 7*a* of the second switching valve 7, is not detectable in the trailer control line 10.2.

A slowly dropping air pressure in the trailer control line 10.2 can also indicate a leak and/or a faulty pressure change behavior, upon which the control unit 3 can initiate corresponding countermeasures and/or protective measures.

In these terms, the electrical connection of the electronic control unit 3 to the components of the braking device 1 and/or the motor vehicle is necessary, so that the control unit 3 can compare data both about, for example, the switching state of the valves and also about the further components to the measurement data of the first and/or second pressure transducer 8.1; 8.2 and can ascertain a faulty pressure change behavior.

According to FIG. 1 furthermore an anti jackknife braking unit 11 is provided in terms of a further input element 4, i.e., as a source of an electrical signal at the control unit 3, and in electrical connection to the control unit 3.

In addition, FIG. 1 shows an inlet valve 11.1 and a vent valve 11.2, which are controllable via the control unit 3, preferably by means of the anti-jackknife braking unit 11.

For this purpose, a control input 11.1*c* of the inlet valve 11.1 and a control input 11.2*c* of the vent valve 11.2 are electrically connected to the control unit 3.

The inlet valve 11.1 additionally comprises, as a normally disconnected 2/2-way valve, an input 11.1*a* and an output 11.1*b*.

The input 11.1a is supplied with compressed air via the compressed air fitting 2 and further components of the pneumatic circuit.

The output 11.1b of the inlet valve 11.1 is connected or connectable according to FIG. 1 via a double check valve of the tractor protective valve 6 to the input 7a of the second switching valve 7.

In terms of a typical double check valve, the connection between the output 11.1b of the inlet valve 11.1 and the input 7a of the second switching valve 7 can be at least temporarily interrupted or disconnected in dependence on the pressure conditions at the interconnected double check valve.

The vent valve 11.2 comprises, as a spring-loaded, normally open 2/2-way valve according to FIG. 1, an input 11.2a and a venting output 11.2b.

The input 11.2a of the vent valve 11.2 is connected to the output 11.1b of the inlet valve.

The input 11.2a of the vent valve 11.2 is also connected or connectable to the input 7a of the second switching valve 7 via the interconnected double check valve of the tractor protective valve 6.

In that the inlet valve 11.1 and the vent valve 11.2 are controllable via the anti-jackknife braking unit 11 and the control unit 3, aerating or venting of the input 7a of the second switching valve 7 can be set intentionally.

In particular, anti jackknife braking to stabilize the motor vehicle can be activated by means of the anti jackknife braking unit 11 and can be performed in a controlled manner with the aid of the electronic control unit 3 by activation as needed of the inlet valve 11.1 and the vent valve 11.2.

Furthermore, it can be provided that in particular using the inlet valve 11.1 and/or the vent valve 11.2, a test pulse can be applied at the input 7a of the second switching valve 7 to detect a pressure change behavior to be expected in the trailer control line 10.2.

In these terms, an electrification of the braking device 1 is achieved, inter alia, by the control unit 3 according to FIG. 1.

Alternatively, notwithstanding FIG. 1, only the first pressure transducer 8.1 can be provided in the trailer supply line 10.1 or in the trailer control line 10.2. In this case, the second pressure transducer 8.2 is omitted without a replacement.

If the first pressure transducer 8.1 is provided in the trailer supply line 10.1, a pressure change behavior in the trailer supply line 10.1 can be detected and if necessary switching of the switching valve 5 can be initiated via the control unit 3.

If the first pressure transducer 8.1 is provided in the trailer control line 10.2, a pressure change behavior can be detected in the trailer control line 10.2 and in the trailer supply line 10.1.

A faulty pressure change behavior in the trailer supply line 10.1, in particular a slow pressure drop or an inadequate air pressure buildup upon startup, has the effect via the coupling line 12 that second switching valve 7 has a disconnected switching state.

As a result, a faulty pressure change behavior in the trailer control line 10.2 is ascertainable due to the disconnected switched second switching valve 7, for example, upon actuation of the service brake of the trailer, with the aid of the first pressure transducer 8.1 in the trailer control line 10.2.

Very generally, in this manner, preferably automatic monitoring of the braking device of a motor vehicle can be triggered with the aid of at least one input element 4, in particular in the form of an electrical signal, for example, of a sensor, switch, or the like in the context of a launch detection, by means of the electronic control unit 3.

LIST OF REFERENCE SIGNS 1 braking device
2 compressed air fitting
3 electronic control unit
4 input element
5 switching valve
5a input of the switching valve
5b output of the switching valve
5c control input of the switching valve
5d venting output of the switching valve
6 tractor protective valve
7 second switching valve
7a input of the second switching valve
7b output of the second switching valve
7c control input of the second switching valve
8.1 first pressure transducer
8.2 second pressure transducer
9.1 first trailer coupling unit
9.2 second trailer coupling unit
10.1 trailer supply line
10.2 trailer control line
11 anti-jackknife braking unit
11.1 inlet valve
11.1a input of the inlet valve
11.1b output of the inlet valve
11.2 vent valve
11.2a input of the vent valve
11.2b output of the vent valve
12 double check valve
13 coupling line

What is claimed is:

1. A method for operating a braking device for a motor vehicle, comprising the acts of:
   along a trailer supply line for aerating a parking brake of a trailer which is provided such that an output of a first switching valve is connected to a first trailer coupling unit, measuring air pressure by way of a first pressure transducer;
   along a trailer control line for aerating a service brake of a trailer, which is provided such that an output of a second switching valve is connected to a second trailer coupling unit, measuring air pressure by way of a second pressure transducer;
   transmitting the measured air pressures, in the form of electrical signals, to an electronic control unit of the motor vehicle, so that in case of a faulty pressure change behavior, an open trailer supply line and/or an open trailer control line is detected.

2. The method as claimed in claim 1, wherein
   the faulty pressure change behavior is detected if the measured air pressures deviate within a predefinable timeframe from a predeterminable pressure change threshold value.

3. The method as claimed in claim 2, wherein
   in the case of a release of the parking brake of the trailer and tearing away of the trailer supply line and/or the trailer control line, a faulty pressure change behavior exists if the measured air pressures change corresponds to an absolute-value pressure change value which is greater than a predeterminable pressure drop threshold value.

4. The method as claimed in claim 2, wherein in the case of an engaged parking brake of the trailer, after the aerating of the trailer supply line and/or the trailer control line and a non-connected trailer supply line or trailer control line, a faulty pressure change behavior exists if the measured air pressures change corresponds to a pressure change value which is less than a predeterminable pressure increase threshold value.

5. The method as claimed in claim 1, wherein for detecting a faulty compressed air change behavior in the trailer control line, a pneumatic test pulse is generated by the first switching valve in conjunction with the trailer supply line and/or a pneumatic test pulse is generated along an input and an output of the second switching valve in conjunction with the trailer control line.

6. The method as claimed in claim 5, wherein the input and the output of the second switching valve are connected to one another and the pneumatic test pulse can be generated by an inlet valve and/or a vent valve or by an electrical braking signal.

7. The method as claimed in claim 6, wherein the first switching valve is provided in conjunction with the trailer supply line, which is switched with aid of the control unit into the venting state if a faulty pressure change behavior is detected in the trailer supply line and/or the trailer control line.

8. A braking device for a motor vehicle, comprising:

at least one compressed air fitting;
an electronic control unit;
at least one input element;
a first switching valve;
a first pressure transducer; and
a first trailer coupling unit and a second trailer coupling unit, wherein
the electronic control unit is connected to the input element, a control input of the first switching valve, and the first pressure transducer,
a trailer supply line is provided such that an output of the first switching valve is connected to the first trailer coupling unit,
a trailer control line is provided, and
a second switching valve,
wherein
the trailer control line is provided such that an output of the second switching valve is connected to the second trailer coupling unit,
the first pressure transducer is provided in conjunction with an output of the first switching valve, and
a second pressure transducer is provided in conjunction with an output of the second switching valve.

9. The braking device as claimed in claim 8, further comprising:

a coupling line provided so that the trailer supply line is connected to a control input of the second switching valve.

10. The braking device as claimed in claim 8, wherein the at least one input element is provided in conjunction with the electronic control unit, so that the first switching valve is switchable by way of the input element.

11. The braking device as claimed in claim 8, wherein an inlet valve is provided such that an input of the second switching valve is connected or connectable to an output of the inlet valve.

12. The braking device as claimed in claim 11, wherein a vent valve is provided such that an input of the vent valve is connected to the output of the inlet valve.

13. The braking device as claimed in claim 12, further comprising:

an anti jackknife braking unit provided in conjunction with the electronic control unit, so that the inlet valve is electrically switchable via a control input and/or the vent valve is electrically switchable via a control input by the control unit.

14. The braking device as claimed in claim 8, wherein the braking device is a utility vehicle braking device.

* * * * *